(12) United States Patent
Sakimoto

(10) Patent No.: US 6,257,776 B1
(45) Date of Patent: Jul. 10, 2001

(54) CAMERA HAVING A BARRIER SLIDABLE BETWEEN POSITIONS TO COVER AND UNCOVER A TAKING LENS

(75) Inventor: Masahiko Sakimoto, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/349,256

(22) Filed: Jul. 8, 1999

(30) Foreign Application Priority Data

Jul. 9, 1998 (JP) ................................................ 10-194148

(51) Int. Cl.⁷ ...................................................... G03B 17/00
(52) U.S. Cl. ............................................................ 396/448
(58) Field of Search .................................. 396/348, 439, 396/448

(56) References Cited

U.S. PATENT DOCUMENTS

| | | | |
|---|---|---|---|
| 3,599,553 | * 8/1971 | Hansen et al. | 396/448 |
| 5,608,478 | * 3/1997 | Kamoda | 396/503 |
| 5,708,891 | 1/1998 | Ando et al. | 396/448 |
| 5,805,947 | * 9/1998 | Miyamoto et al. | 396/448 |
| 5,822,638 | * 10/1998 | Yoshida et al. | 396/448 |
| 5,943,521 | * 8/1999 | Lamphron et al. | 396/448 |
| 6,036,376 | * 3/2000 | Owashi et al. | 396/349 |

FOREIGN PATENT DOCUMENTS

| | | |
|---|---|---|
| 07013242 | 1/1995 | (JP) . |
| 09197479 | 7/1997 | (JP) . |

\* cited by examiner

*Primary Examiner*—David M. Gray
(74) *Attorney, Agent, or Firm*—McDermott, Will & Emery

(57) ABSTRACT

A camera has a taking lens, a cover for covering a body of the camera, a barrier, and a holding mechanism for holding the barrier on the cover in such a way that the barrier is slidable between a position in which it keeps the taking lens covered and a position in which it leaves the taking lens uncovered. The cover has an opening. The holding mechanism has a rail provided on the barrier and inserted through the opening of the cover into the body of the camera in such a way that the cover is sandwiched between the rail and the barrier, and a guide member provided inside the body of the camera so as to guide the rail.

7 Claims, 3 Drawing Sheets

CAMERA HAVING A BARRIER SLIDABLE BETWEEN POSITIONS TO COVER AND UNCOVER A TAKING LENS

This application is based on application No. H10-194148 filed in Japan, the content of which is hereby incorporated by reference.

BACKGROUND OF THE INVENTION

1. Field of the Invention

The present invention relates to a camera, and particularly to a camera having a barrier that is slidable between a position in which it keeps a taking lens covered and a position in which it leaves the taking lens uncovered.

2. Description of the Prior Art

In a camera, a barrier slides between a fully-closed position in which it covers the front-end surface of a taking lens and a fully-open position in which it is retracted from the front-end surface of the taking lens. In this way, the barrier serves to protect the taking lens when no shooting is performed and, in some cases, also serves as a starting switch to make the camera system ready for shooting. FIG. 6 is a schematic perspective view showing a conventional example of the structure of such a barrier.

As shown in FIG. 6, a barrier 3 has two, upper and lower, rails 40 and 41 provided integrally therewith, and these rails 40 and 41 are held between a plurality of rotatable guide rollers 8 or the like provided integrally with a body cover 2 of a camera 1. The rails 40 and 41 are linearly guided by these guide rollers 8 so that the barrier 3 slides across the front-end surface of a taking lens L. Moreover, a click roller 7 is provided that is pressed against one of the rails 40 from above by a compression spring 6 or the like so as to be slidable by rotation along the rail 40. When the barrier 3 is in a fully-open position or in a fully-closed position, this click roller 7 engages with an engagement groove 40a or 40b, respectively, formed in the rail 40 so as to exert a clicking force in those two positions.

However, as long as such a sliding mechanism is used to slide the barrier 3, as the camera is made more compact, the rails 40 and 41 need to be made shorter so as not to protrude from the barrier 3. Correspondingly, the intervals between the guide rollers 8a and 8b and between the guide rollers 8c and 8d need to be made shorter so that the rails 40 and 41 will not come off the guide rollers 8 when the barrier 3 is in the fully-open position.

Between the guide rollers 8a, 8b, 8c, and 8d and the rails 40 and 41, there are secured gaps that allow the rails 40 and 41 to slide, and thus the barrier 3 is somewhat inclined while sliding. Accordingly, making the intervals between the guide rollers 8a and 8b and between the guide rollers 8c and 8d shorter causes the barrier 3 to be more inclined while sliding. This makes the sliding movement of the barrier 3 unstable, and thereby degrades the feel of operation of the camera.

Moreover, though not shown in FIG. 6, it is necessary to separately provide positioning members to restrict the movement of the barrier 3 in the front-rear direction of the camera so as not to come off the body cover 2. This increases the number of components required, and thus increases the overall costs.

SUMMARY OF THE INVENTION

An object of the present invention is to provide a camera that requires less components and thus less costs and that can be made more compact without sacrificing stable sliding movement of a barrier and thus with an improved feel of operation.

To achieve the above object, according to one aspect of the present invention, a camera is provided with: a taking lens; a cover for covering the body of the camera, the cover having an opening; a barrier; and a holding mechanism for holding the barrier on the cover in such a way that the barrier is slidable between a position in which it keeps the taking lens covered and a position in which it leaves the taking lens uncovered. The holding mechanism has: a rail provided on the barrier and inserted through the opening of the cover into the body of the camera in such a way that the cover is sandwiched between the rail and the barrier; and a guide member provided inside the body of the camera so as to guide the rail.

According to another aspect of the present invention, a camera is provided with: a taking lens provided on the front surface of the body of the camera; a barrier; and a holding mechanism for holding the barrier on the body of the camera in such a way that the barrier is slidable between a position in which it keeps the taking lens covered and a position in which it leaves the taking lens uncovered. The holding mechanism is provided on the rear surface of the body of the camera.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
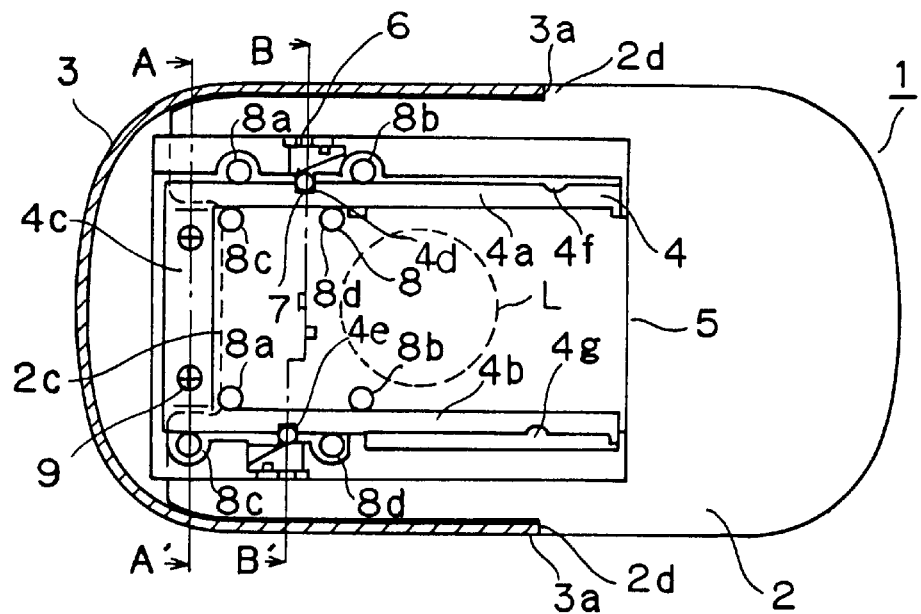
FIG. 1 is a schematic rear view of a camera embodying the invention.
Figure 2:
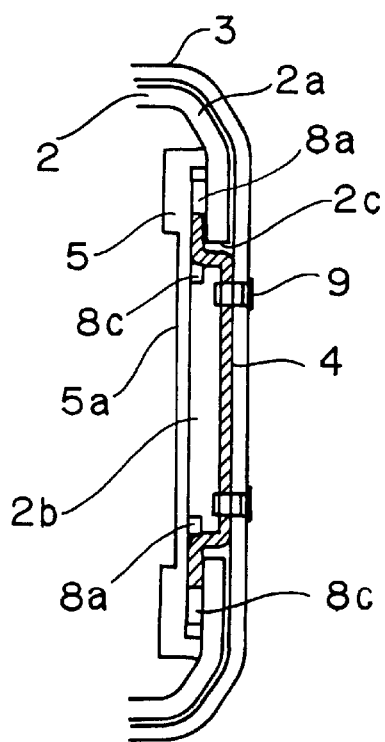
FIG. 2 is a section of the camera shown in FIG. 1, taken along the line A–A' shown in FIG. 1.
Figure 3:
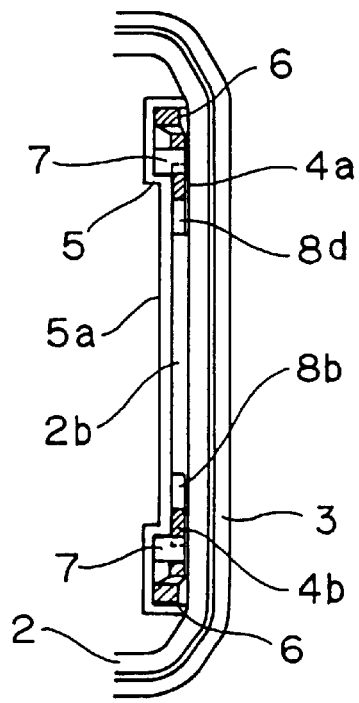
FIG. 3 is a section of the camera shown in FIG. 1, taken along the line B–B' shown in FIG. 1.
Figure 6:
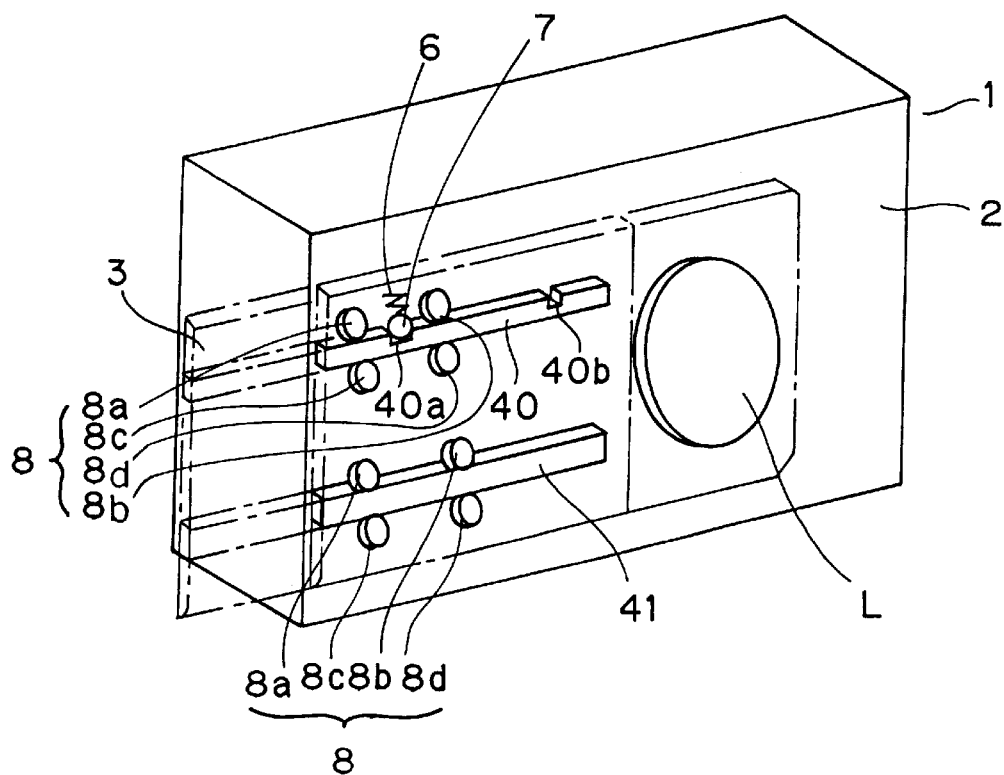
FIG. 6 is a schematic rear view of a conventional camera.

Hereinafter, embodiments of the present invention will be described with reference to the accompanying drawings. For simplicity's sake, such members as are found also in the conventional example shown in FIG. 6 are identified with the same reference numerals. FIG. 1 is a schematic rear view of a camera embodying the invention, and FIGS. 2 and 3 are sections of the same camera taken along the line A–A' and B–B' shown in FIG. 1, respectively. As shown in these figures, in a camera 1 of a so-called "full capsule type" in which a barrier covers the entire surface of one side of a body casing 2, a pressing plate 5 is fitted on the rear-side outer wall 2a of the body casing 2, in the position corresponding to a taking lens L, so that the pressing plate 5 presses a photographic film (not shown) with its pressing surface 5a and thereby keeps the film flat during shooting.

Between the pressing plate 5 and the outer wall 2a of the body casing 2, an opening 2b is formed so as to be open to the left as seen in FIG. 1. To a barrier 3, a C-shaped rail member 4 is fitted, with its linking portion 4c fixed to the barrier 3 with screws 9 and with its rail portions 4a and 4b inserted into the opening 2b. The gap (depth) of the opening 2b (i.e. the gap between the outer wall 2a and the pressing plate 5) is made approximately equal to the thickness of the rail portions 4a and 4b so as to restrict the movement of the rail member 4 in the front-rear direction of the camera. In the body casing 2, a clearance 2c is formed to avoid interference with the linking portion 4c.

On the pressing plate 5, rotatable guide rollers 8 (8a, 8b, 8c, and 8d) are fitted so as to slidably sandwich each of the rail portions 4a and 4b from above and below and thereby linearly guide the rail portions 4a and 4b. At the top and bottom of the pressing plate 5 are provided plate springs 6, which press click rollers 7 provided at their end against the rail portions 4a and 4b so that a clicking force occurs when the click rollers 7 engage with engagement grooves 4d, 4e, 4f, and 4g formed in the rail portions 4a and 4b.

Figure 4:
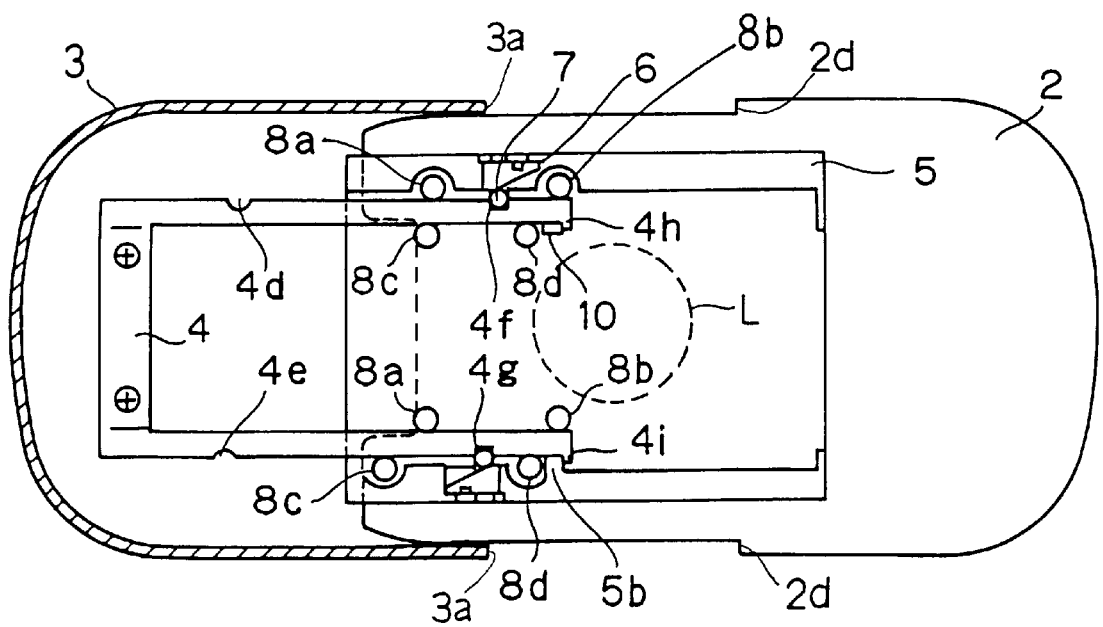
FIG. 4 is a schematic rear view of the camera shown in FIG. 1, in its state with the barrier in the open position.

In this camera 1, when the barrier 3 is opened, the barrier 3 slides leftward as seen in FIG. 1 from the fully-closed position shown in FIG. 1 in which it covers the taking lens L, with the rail portions 4a and 4b guided by the guide rollers 8. When, as shown in FIG. 4, the barrier 3 reaches the fully-open position in which it exposes the taking lens L, a stopper 10 provided on the body casing 2 and a stopper portion 5b provided on the pressing plate 5 strike hook portions 4h and 4i provided on the rail portions 4a and 4b, and thus the barrier 3 stops sliding. At this time, the click rollers 7 engage with the engagement grooves 4f and 4g formed in the rail portions 4a and 4b, giving the photographer a clicking feel.

Similarly, when the barrier 3 is closed, the barrier 3 slides, with the rail portions 4a and 4b guided by the guide rollers 8. When the barrier 3 reaches the fully-closed position shown in FIG. 1, the end surfaces 3a of the barrier 3 strike stopper surfaces 2d formed in the body casing 2, and thus the barrier 3 stops sliding.

In the figures, the left-hand guide rollers 8a and 8c are so arranged as not to interfere with the linking portion 4c or other members when the barrier 3 is in the fully-closed position (see FIG. 1), and the right-hand guide rollers 8b and 8d are so arranged that the rail portions 4a and 4b do not come off them when the barrier 3 is in the fully-open position (see FIG. 4). The inclination of the rail member 4 due to the gaps between the rail portions 4a and 4b and the guide rollers 8 depends, for clockwise inclination, on the gaps between the guide rollers 8a and 8d and the rail portions 4a and 4b and, for counter-clockwise inclination, on the gaps between the guide rollers 8b and 8c and the rail portions 4a and 4b.

In this embodiment, the rail portions 4a and 4b of the rail member 4 are arranged inside the body casing 2 so as not to appear on the surface. Therefore, even if the rail portions 4a and 4b are made so long as to protrude laterally from the end surfaces 3a of the barrier 3, they do not spoil the appearance of the camera. This makes it possible to make longer the lateral intervals between the guide rollers 8a and 8d and between the guide rollers 8b and 8c. Accordingly, the camera 1 can be made more compact while keeping the inclination of the rail member 4 so small that the barrier 3 is stably guided linearly, and thus with an improved feel of operation of the camera.

Figure 5:
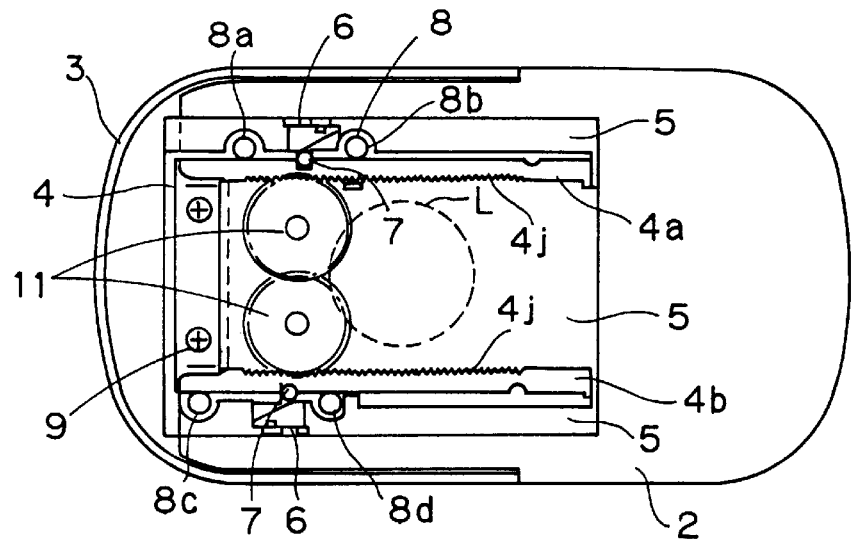
FIG. 5 is a schematic rear view of another camera embodying the invention.

Alternatively, as shown in FIG. 5, which is a schematic rear view of another camera embodying the invention, it is also possible to provide, in the rail portions 4a and 4b of the rail member 4, gear portions 4j that mesh with gears 11 so that the barrier 3 is guided linearly by the gears 11 and the guide rollers 8. Also in this case, it is possible to make longer the lateral intervals between the guide rollers 8a and 8d and between the guide rollers 8b and 8c to keep the inclination of the rail member 4 small, and thus achieve the same effects as in the previous embodiment

What is claimed is:

1. A camera comprising:

a taking lens;

a cover for covering a body of the camera, the cover having an opening;

a barrier; and a holding mechanism holding the barrier on the cover and enabling the barrier to be slidable between a position which keeps the taking lens covered and a position which leaves the taking lens uncovered, the holding mechanism having:

a rail provided on the barrier and inserted through the opening of the cover into the body of the camera, sandwiching a portion of the cover between the rail and the barrier; and a guide member provided inside the body of the camera so as to guide the rail.

2. The camera as claimed in claim 1, further comprising:

a pressing plate provided inside the body of the camera so as to hold a photographic film flat during shooting, wherein the rail is sandwiched between the pressing plate and the cover.

3. The camera as claimed in claim 2, wherein the cover has an outer wall and the opening is formed between the pressing plate and the outer wall of the cover.

4. A camera comprising:

a body having a front surface facing away from the camera and a rear surface opposed to the front surface;

a taking lens provided on the front surface of the body of the camera;

a barrier; and a holding mechanism holding the barrier on the body of the camera and enabling the barrier to be slidable between a position which keeps the taking lens covered and a position which leaves the taking lens uncovered, the holding mechanism being provide on the rear surface of the body of the camera.

5. The camera as claimed in claim 4, wherein the holding mechanism has a rail and a guide member for guiding the rail.

6. The camera as claimed in claim 5, wherein the rail is a C-shaped member provided on the barrier, and the guide member is provided on the body of the camera.

7. The camera as claimed in claim 5, wherein the rail is a C-shaped member provided on the barrier and a portion of the body of the camera is sandwiched between a portion of the C-shaped member and the barrier.

* * * * *